United States Patent
Serpa

(10) Patent No.: US 9,394,027 B2
(45) Date of Patent: Jul. 19, 2016

(54) FRAME FOR A HUMAN-POWERED VEHICLE

(71) Applicant: Michael Lawrence Serpa, Oakland, CA (US)

(72) Inventor: Michael Lawrence Serpa, Oakland, CA (US)

( * ) Notice: Subject to any disclaimer, the term of this patent is extended or adjusted under 35 U.S.C. 154(b) by 331 days.

(21) Appl. No.: 13/987,561

(22) Filed: Aug. 7, 2013

(65) Prior Publication Data

US 2015/0042063 A1 Feb. 12, 2015

(51) Int. Cl.
*B62K 5/05* (2013.01)
*B62K 5/06* (2006.01)
*B62K 15/00* (2006.01)

(52) U.S. Cl.
CPC ... *B62K 5/05* (2013.01); *B62K 5/06* (2013.01); *B62K 15/006* (2013.01)

(58) Field of Classification Search
CPC ............... B62K 5/00; B62K 5/05; B62K 5/06
USPC ......................................................... 280/209
See application file for complete search history.

(56) References Cited

U.S. PATENT DOCUMENTS

| | | | |
|---|---|---|---|
| 3,561,778 A * | 2/1971 | La Brie | B62K 5/10 280/12.14 |
| 4,277,078 A | 7/1981 | Root | |
| 4,290,620 A * | 9/1981 | Chika | B60G 21/055 280/209 |
| 5,145,196 A * | 9/1992 | Langkamp | A61G 5/023 280/278 |
| 6,811,172 B2 | 11/2004 | Yen | |
| 6,817,617 B2 * | 11/2004 | Hayashi | B62K 5/05 280/124.1 |
| 6,953,203 B2 * | 10/2005 | Wilcox | B62K 3/005 280/282 |
| 7,066,480 B2 | 6/2006 | Brichet et al. | |
| 7,708,291 B1 * | 5/2010 | Henderson | B62D 9/02 280/124.103 |
| 8,016,302 B1 | 9/2011 | Reeve | |
| 8,016,311 B1 | 9/2011 | Hadzicki et al. | |
| 8,167,768 B2 | 5/2012 | Hartmann | |
| 8,256,784 B2 | 9/2012 | Hadzicki et al. | |
| 2004/0251655 A1 | 12/2004 | Lindsay et al. | |
| 2015/0014957 A1 * | 1/2015 | Aponte-Rivera | B62K 13/06 280/209 |
| 2015/0069732 A1 * | 3/2015 | Godlewski | B62K 9/02 280/202 |

FOREIGN PATENT DOCUMENTS

| | | |
|---|---|---|
| FR | 1078044 A | 11/1954 |
| FR | 2819230 A1 | 7/2002 |
| WO | WO 01/68440 A1 | 9/2001 |

OTHER PUBLICATIONS

Ackermann steering geometry, http://en.wikipedia.org/wiki/Ackermann_steering_geometry, Wikipedia, the free encyclopedia, 2 pages, last accessed Feb. 17, 2015.
International Search Report and Written Opinion mailed Feb. 23, 2015 in International Application No. PCT/US2014/000166, 10 pages.

* cited by examiner

*Primary Examiner* — Kevin Hurley
(74) *Attorney, Agent, or Firm* — Knobbe, Martens, Olson & Bear LLP

(57) ABSTRACT

The preferred embodiments provide a frame for a one person three-wheeled human powered vehicle, the rear portion of which resembles an upright bicycle frame capable of supporting a fixed rear drive wheel substantially in alignment with the frame centerline. The frame has a left-side lateral extension and a right-side lateral extension, each of which includes a head tube at or near its outer end where front forks or steering posts can be secured. Each front fork or steering post can then hold one of two front steerable wheels. The frame is compatible with shock-absorbing suspension technology, which can be employed if desired.

22 Claims, 6 Drawing Sheets

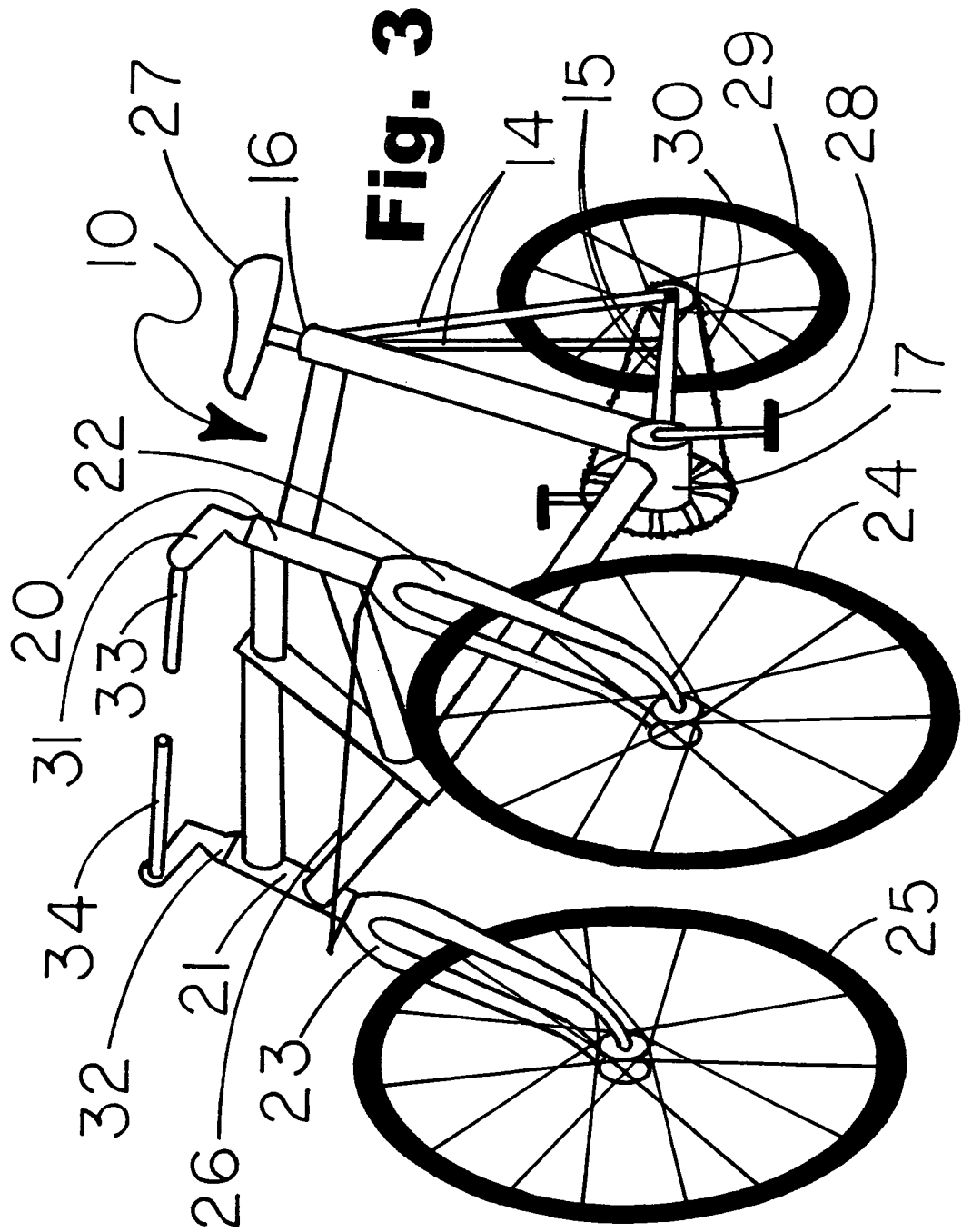

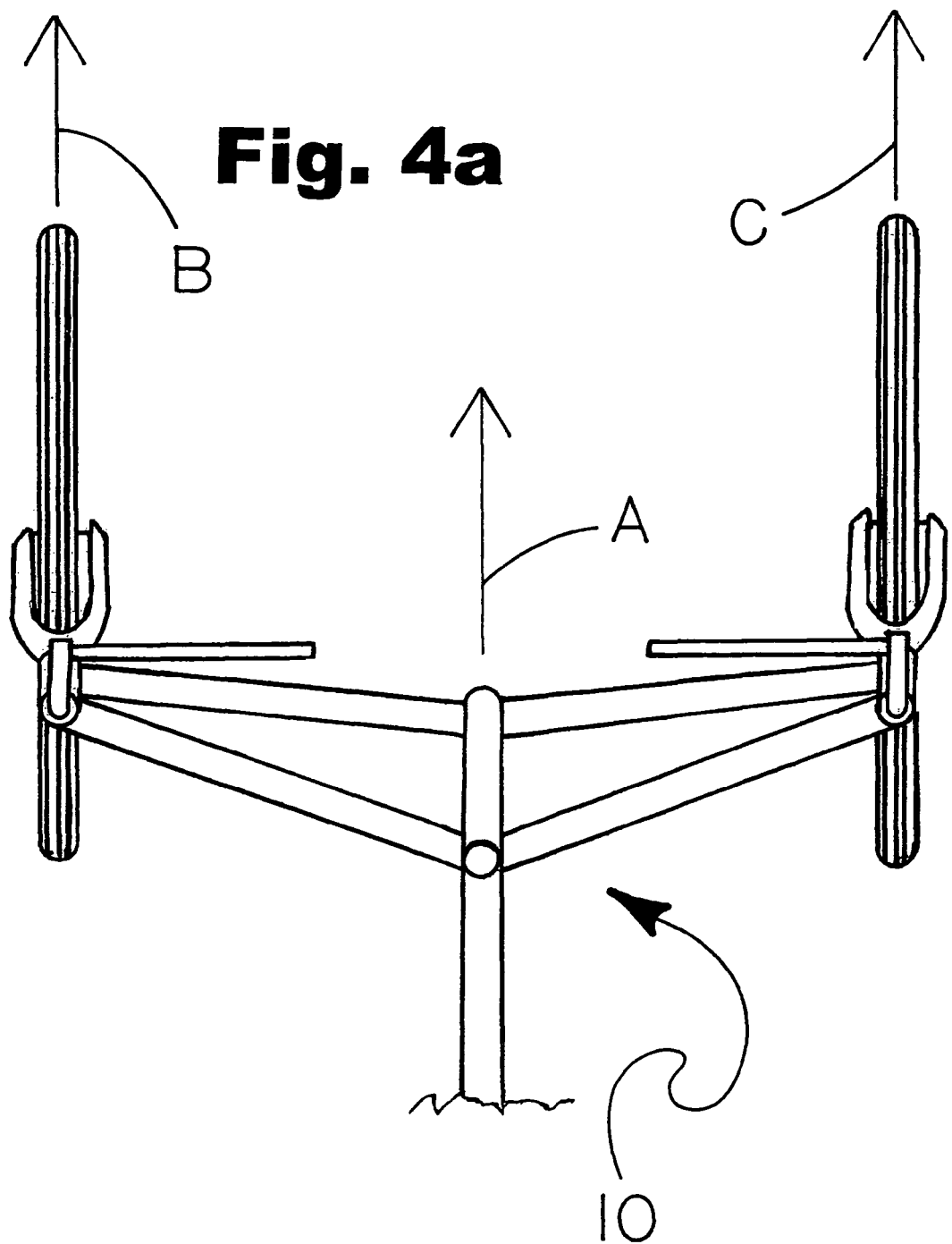

FRAME FOR A HUMAN-POWERED VEHICLE

FIELD OF THE INVENTION

This invention relates to wheeled vehicles propelled by human effort.

BACKGROUND OF THE INVENTION

Bicycle riding is an efficient mode of transportation that provides exercise as well as enjoyment. Because they are human-powered, this activity requires no fossil fuels (an increasingly important consideration). First developed long ago, bikes can be found throughout the world. Some individuals have even pedaled them across continents.

The frame of a bicycle supports two wheels situated along the frame's centerline, with the front wheel serving as the steerable wheel used to control the vehicle's direction and the rear wheel serving as the drive wheel receiving power input from the rider. A typical bicycle frame has a top tube, a seat tube, a down tube, a head tube, two seat stays, two chain stays, and a bottom bracket shell. (Some bikes intended for women have a top tube that attaches lower down on the seat tube compared to a man's bike.) The steerable front wheel is secured to front forks installed in the head tube, and the fixed rear wheel is situated between the seat stays and chain stays. The seat—sometimes called a saddle—is located above the top tube and is normally attached to the frame via a seat post arrangement.

Young children usually begin their riding adventures aboard tricycles which, due to the three wheel design, have greater stability than bicycles. (A vehicle having three wheels in simultaneous contact with the ground reflects the stability of a tripod.) When their sense of balance has sufficiently developed, many kids move up to the two-wheeled vehicle variety.

A child's trike has a steerable wheel in front and two fixed wheels in the back. The front wheel is connected to a handlebar which enables the user to turn the wheel and change the vehicle's direction of travel. Pedals attached to the front wheel provide the means by which the operator contributes propulsive effort.

The frame of a child's tricycle is a rather simple affair, providing places of attachment for a seat as well as the two rear wheels. A front fork holds the front wheel.

There are so-called "adult tricycles", the frames of which resemble in many respects a bigger form of the children's version. Like a child's trike, these vehicles have one steerable wheel in front and two at the rear in a fixed position. The front wheel is secured to the frame at a front fork. Again, a handlebar provides a user with the ability to turn the front fork and thereby control the front wheel. The rear wheels are attached to the frame at portions of the frame which branch out from the frame's centerline.

Turning an adult tricycle is similar to controlling a bicycle. The user rotates the handlebar such that the handlebar rotates about a pivot point.

The primary difference between the adult tricycle and the one meant for a child is that in the adult version the pedals are affixed to crank arms secured at a low point on the trike's frame with a ball bearing setup known as a bottom bracket, similar to the arrangement on a bicycle. A sprocket attached to the crank arms then exerts force on a drive chain which runs to another sprocket on a transverse axle connecting the two rear wheels. Downward pressure on the pedals moves the crank arms and pulls on the chain, resulting in forward motion. Another difference between a child's tricycle and the one used by grownups is that adult tricycles often utilize hand brakes.

Usually a cargo basket is situated between the rear wheels of an adult tricycle to facilitate the transportation of groceries or whatnot.

Adult tricycles are "upright" designs, where the rider sits astride the seat and stands on the pedals. That is, the crank arms are placed for the most part in a space below the seat. This is the arrangement used on most bicycles, like city bikes, road bikes, and mountain bikes. (The standard upright bicycle frame is sometimes referred to as the "diamond frame" in reference to its shape.)

These adult tricycles are popular and serve many functions. For example, they are used by those who have motor-balance issues which prevent the individual from riding a bicycle. A number of these riders could very well be elderly persons who still want to enjoy cycling yet don't feel comfortable doing so on a two-wheeled vehicle. The adult tricycle provides them with a viable alternative.

There are also younger riders who, for one reason or another, find adult tricycles useful. Some of these individuals have a physical limitation which prevents them from operating a bicycle. For them the adult tricycle's stable platform is the only option for cycling.

But in fact other applications for these vehicles abound. They have been used by food vendors and delivery persons alike. The stability three wheels offers not only simplifies hauling a load but also remains steady after the rider dismounts, thus eliminating the need for a kickstand. Adult tricycles are also employed in warehouses, at assembly plants, and on factory floors. In this capacity they provide a non-polluting form of transportation for efficiently moving about people and supplies. The vehicles furthermore tender a secondary benefit to the workers operating them by the possibility of improved physical fitness.

Even someone able to safely ride a bicycle might prefer an adult tricycle in certain situations. Case in point could be a watersports enthusiast transporting a bulky/unwieldy object (e.g., a stand-up paddleboard or a sea kayak) to the shore. A trailer holding the transport item and towed by an adult tricycle would likely be a less problematic experience than towing the same trailer with a two-wheel bike.

[NOTE: A three-wheel vehicle will have greater potential braking authority than a bicycle simply because, by virtue of an additional wheel, it has more ground contact and can thereby exert more stopping friction. This provides a performance gain when transporting heavier items or descending steep inclines.]

Though they are extremely useful, adult tricycles are not without disadvantages. First and foremost among these disadvantages is that a three-wheeled vehicle with one wheel in front and two at the rear can lose platform stability when cornering if it is moving too fast. Centrifugal force acting upon the user's body tends to pull the rear wheel on the inside of the turn off the ground. If this happens and the user fails to regain control, the tricycle will tip over.

(This is the reason the All Terrain Vehicle—or ATV—industry no longer manufactures a three-wheeled version of these machines. Those vehicles were accident-prone and caused many injuries. The four-wheeled "quad" set-up, with two wheels in front, is now standard.)

The prior art offers some recumbent trike designs, intended for adults, which place two wheels in front with a single drive wheel in back. (Recumbent tricycles and bicycles place the rider in a reclining position such that, when pedaling, the rider's legs are essentially horizontal to the ground because the pedals are more or less level with the seat.) These arrangements appeal to some users, but not everyone is comfortable riding them. There are individuals who find getting in and out of a recumbent trike physically difficult because the seat sits so low to the ground. Also, there's a safety issue in that motor vehicle drivers might be less likely to spot a recumbent trike rider than they would the rider of an upright tricycle or bicycle. Recumbent vehicles (there are recumbent bicycles as well as tricycles) could be concealed by things like parked cars, whereas the upright tricycle or bicycle presents a taller profile. Many riders also go with the upright cycle variety purely as a matter of personal preference. (Upright cycles are easier to pedal uphill because the rider can use their body weight to apply force to the pedals.) A final feature of incumbent trikes which diminishes their usage is that the space between the two front wheels—which would otherwise be the ideal location for a cargo basket—is occupied by the crank arm/pedals assembly used to propel the vehicle. Once the rider's legs are added, there's simply no room for anything else in the area. This aspect of recumbent tricycle limits their utility. For these reasons the upright adult tricycle design suits many users better. Recumbent cycles are not for everybody.

However, there's still another major disadvantage of the conventional adult tricycle: its bulk. Adult tricycles take up far more space than a bicycle. This can be a problem for someone who desires to cycle to work, for example, but who also must use public transportation for part of the commute. Bicycles can easily be taken aboard a subway train or stowed on a city bus bike rack, but this is not the case with an adult tricycle. (And try to imagine taking an adult tricycle onto a subway escalator or into a busy elevator car.)

Therefore, a pedal-propelled three-wheel upright, one person vehicle design placing two wheels in front and a single fixed wheel at the rear would have value. The dual front wheel arrangement would improve upon the adult tricycle's tendency to tip when executing a turn, hence contributing to enhanced vehicle stability. The upright arrangement would appeal to users who favor this arrangement over recumbent vehicles. And if the two front wheels were both steerable, this would result in improved steering control over the prior art adult tricycle because two wheels provide more traction than a single wheel (especially when cycling on loose ground, such as trail biking). In addition, if a steering mechanism could be devised that not only enabled the rider to control the vehicle but also permitted the two front wheels to be decoupled so as to move independently when the vehicle is not in use, the frame could be made foldable. The preferred embodiments address these needs by providing an innovative alternative to the traditional adult tricycle, resulting in a versatile cycling apparatus that opens up more transportation and recreation possibilities.

SUMMARY OF THE INVENTION

A preferred embodiment comprises a frame for a one person (meaning a vehicle built from the frame transports a sole rider) human-powered vehicle capable of supporting two steerable front wheels and one fixed drive wheel in the rear. Much of the frame resembles that of an upright bicycle, with a place for attaching a seat post or seat located above a bottom bracket shell. These are arrayed along the frame's centerline, as on a bicycle.

The vehicle differs from a bicycle, however, in that it has two lateral frame extensions at the front, one extending out to the left and the other to the right. The frame accordingly has a "T" or "Y" shape when viewed from above. At or near the outer edge of each of these extensions is a head tube. Each of the two head tubes serve as the installation point for a steering member, such as a steering fork or steering post. (A steering post is a "one-legged" or one-sided fork, with or without offset.) The steering forks/steering posts are preferably joined by a tie member such as a tie rod to ensure they turn in concert. (If the tie rod is detachable, the frame can be made foldable.)

If a left-side steering fork/steering post and a right-side steering fork/steering post are added, these will serve as attachment points for two front wheels. A handlebar stem could then be joined to the left-side steering fork/steering post and a second handlebar stem could be joined to the right-side steering fork/steering post. A left-side handlebar can be attached to the left-side handlebar stem, and a right-side handlebar can be attached to the right-side handlebar stem. A left-side front wheel can be secured to the left-side steering fork/steering post and a right-side front wheel can be secured to the right-side steering fork/steering post. When a user turns this vehicle both steering handles move, though in doing so they rotate about separate pivot points.

If desired, the frame can include a cargo basket or rack situated between the two front wheels. Stopping power can come from coaster brakes and/or handbrakes. And the preferred embodiments are fully compatible with front and rear shock-absorbing suspension technology.

(The preferred embodiments can also employ so-called "Ackermann Steering Geometry" which enables the front steering wheels of a vehicle to have different turning radiuses. One wheel turns at a sharper angle than the other. As a result, the wheel on the inside of a turn will trace a smaller circle than the wheel on the outside of the turn. This reduces wheel slippage when turning, improves control, and results in longer tire tread life.)

Accordingly, several advantages of one or more aspects of the preferred embodiments are as follows: to provide a frame for an upright three-wheeled one person human-powered vehicle that can support two steerable front wheels resulting in improved cornering stability; to provide a frame for an upright three-wheeled one person human-powered vehicle that can be made foldable; to provide a frame for an upright three-wheeled one person human-powered vehicle that can utilize off-the-shelf bicycle components; and to provide a simplified three-wheeled vehicle design which does not require a transverse axle such as that found on the adult tricycle. Other advantages of one or more aspects will be apparent from a consideration of the drawings and ensuing description.

DRAWING FIGURES

FIG. 3 is a perspective view of one embodiment equipped with components that results in a vehicle a user can ride.

FIGS. 4a and 4b are top plan views illustrating operation of the steering arrangement employed by the preferred embodiments.

DETAILED DESCRIPTION OF THE PREFERRED EMBODIMENTS AND THEIR OPERATION

Figure 1:
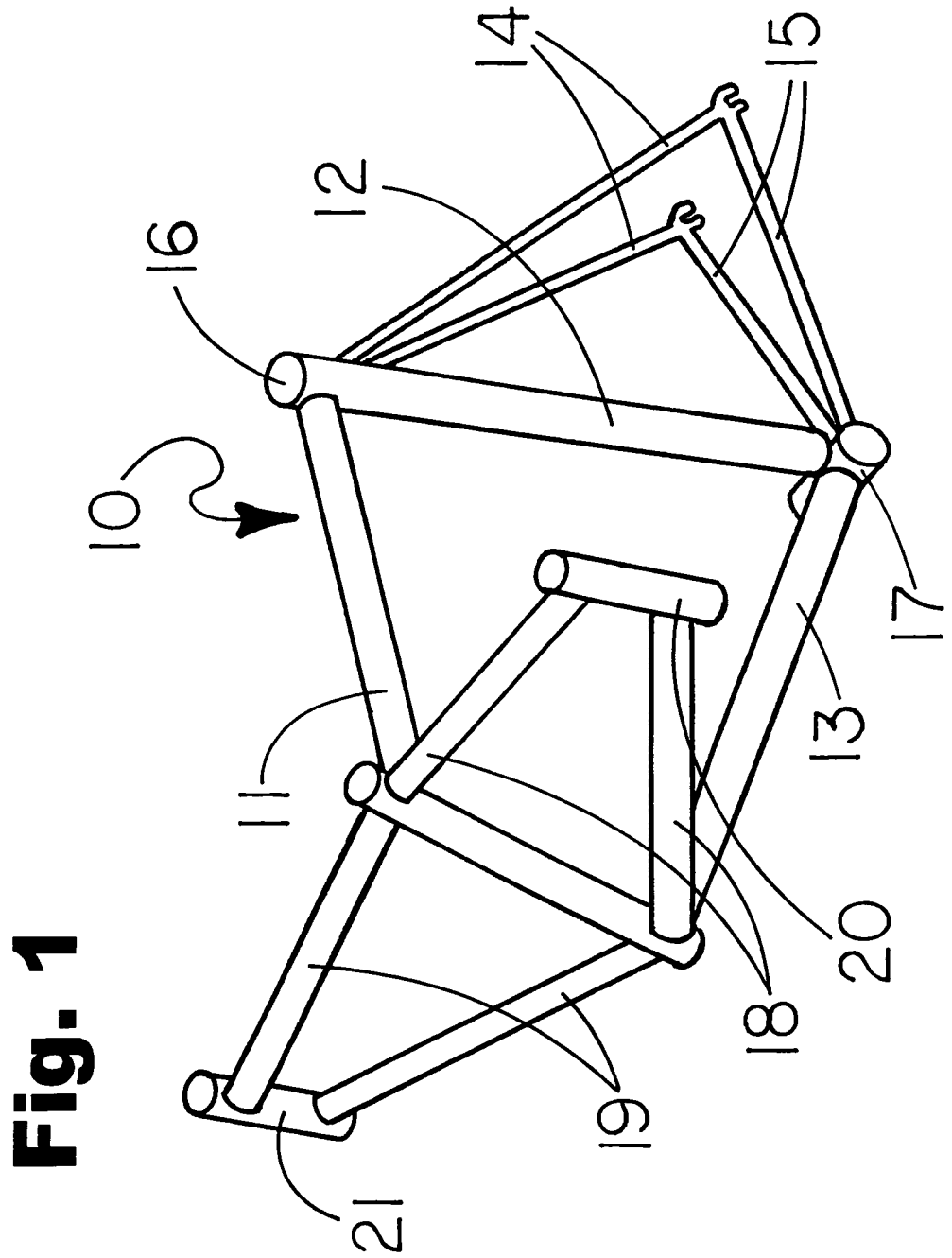
FIG. 1 is a perspective view of one embodiment.

In FIG. 1 is shown a frame 10 made in accordance with one embodiment. The frame 10 has a top tube 11, a seat tube 12, a down tube 13, seat stays 14, and chain stays 15. The frame further includes a place for attaching a seat post or seat 16, and a bottom bracket shell 17.

The bottom bracket shell 17 is situated more or less beneath the place for attaching a seat post or seat 16, thus making the frame 10 an upright design. Furthermore, the frame 10 serves as the basis for a one person human-powered vehicle.

Forward of the bottom bracket shell 17 is a left-side lateral extension 18 and a right-side lateral extension 19. At or near the outer end (i.e., the end furthest from the top tube 11) of the left-side lateral extension 18 is a left-side head tube 20, and at or near the outer end of the right-side lateral extension 19 is a right-side head tube 21. The left-side head tube 20 and the right-side head tube 21 are level with one another and equidistant from the top tube 11.

Though not shown, the frame 10 can include a cargo basket or storage rack.

If the left-side head tube 20 and the right-side head tube 21 are capable of accepting standard ball bearing headset arrangements such as those found in use aboard bicycles, then the frame 10 can utilize these off-the-shelf bicycle components, among others.

(There are several gains from utilizing off-the-shelf bicycle components. First, such parts are readily available, so manufacturing costs are reduced. Second, no special skills beyond those possessed by a bike mechanic would be necessary to repair/maintain a vehicle assembled from the preferred embodiments. Finally, many users are already familiar with these components and their operation.)

Figure 2:
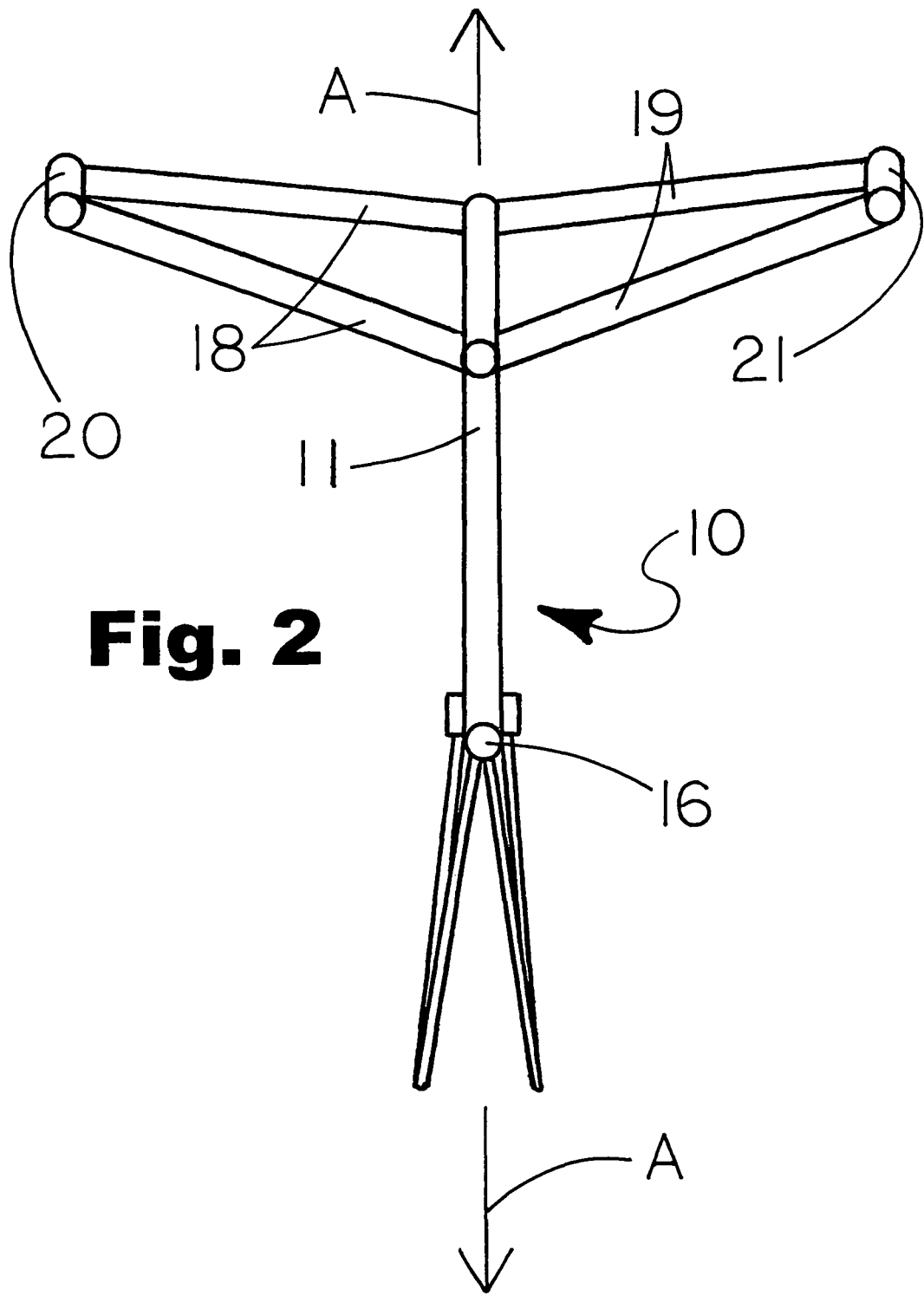
FIG. 2 is a top plan view of one embodiment.

FIG. 2 shows a top plan view of the frame 10, revealing the general resemblance to a capital letter "T" or "Y". The frame 10 centerline is indicated by arrows "A". The top tube 11 and the place for attaching a seat post or seat 16 are substantially in alignment with the centerline. A rear drive wheel, if added, would ideally be in a fixed position situated between the seat stays 14 and the chain stays 15, like on a bicycle, and if so included the rear drive wheel would be substantially in alignment with the centerline. Thus, the frame 10 is capable of supporting a fixed rear drive wheel substantially in alignment with the centerline.

In FIG. 2 is shown also the left-side lateral extension 18, the left-side head tube 20, the right-side lateral extension 19, and the right-side heat tube 21.

In FIG. 3 is shown an embodiment equipped with components to produce a vehicle that can be ridden. A left-side steering member, such as the illustrated left-side steering fork 22, has been secured in the left-side head tube 20 and a right-side steering member, such as the illustrated right-side steering fork 23, has been installed in the right-side head tube 21. Both the left-side steering fork 22 and the right-side steering fork 23 should be capable of rotating to execute a turning function. Preferably, a ball-bearing headset arrangement (not shown) is used with each to secure them to the frame 10.

A left front wheel 24 has been secured to the left-side steering fork 22 and a right front wheel 25 has been secured to the right-side steering fork 23.

A member, such as a tie rod 26, joins the left-side steering fork 22 to the right-side turning fork 23 to ensure they turn in concert. The tie rod 26 can make use of Ackermann Steering. (The key to Ackermann Steering Geometry is to make the tie rod 26 shorter than the actual distance between the left front wheel 24 and the right front wheel 25.) Thus, the frame 10 is capable of employing Ackermann Steering Geometry.

Affixed to the place for attaching a seat post or seat 16 is a seat post/seat combination 27. And attached to the bottom bracket shell 17 is a crank arms/sprocket/pedals combination 28.

A fixed rear drive wheel 29 has been secured to frame 10 between the seat stays 14 and the chain stays 15, and a chain 30 connects the fixed rear drive wheel 29 to the crank arms/sprocket/pedals combination 28.

A left-side handlebar stem 31 is affixed to the left-side steering fork 22 and a right-side handlebar stem 32 is affixed to the right-side steering fork 23. Joined to the left-side handlebar stem 31 is a left-side handlebar 33, and joined to the right-side handlebar stem 32 is a right-side handlebar 34. Thus, the frame 10 is capable of employing a steering arrangement having a left-side handlebar 33 and a right-side handlebar 32. Furthermore, the left-side handlebar 33 and the right-side handlebar 34 are not joined to one another.

When the vehicle of FIG. 3 executes a turn the left-side handlebar 33 and the right-side handlebar 34 will swing away from one another, each rotating about a separate pivot point. The pivot point for the left-side handlebar 33 is the left-side head tube 20, while the pivot point for the right-side handlebar 34 is the right-side head tube 21.

Though not shown, it should be apparent from a review of FIG. 3 that the vehicle depicted is fully compatible with both front and rear shock-absorbing suspension technology. Therefore, the frame 10 is capable of employing shock-absorbing suspension technology. Also, if the resulting vehicle employs hand brakes, one brake lever can operate a brake which acts on the fixed rear drive wheel 29 while the second brake lever can be a dual-cable design which operates two brakes simultaneously—one acting on the left front wheel 24 and one acting on the right front wheel 25.

Figure 4B:
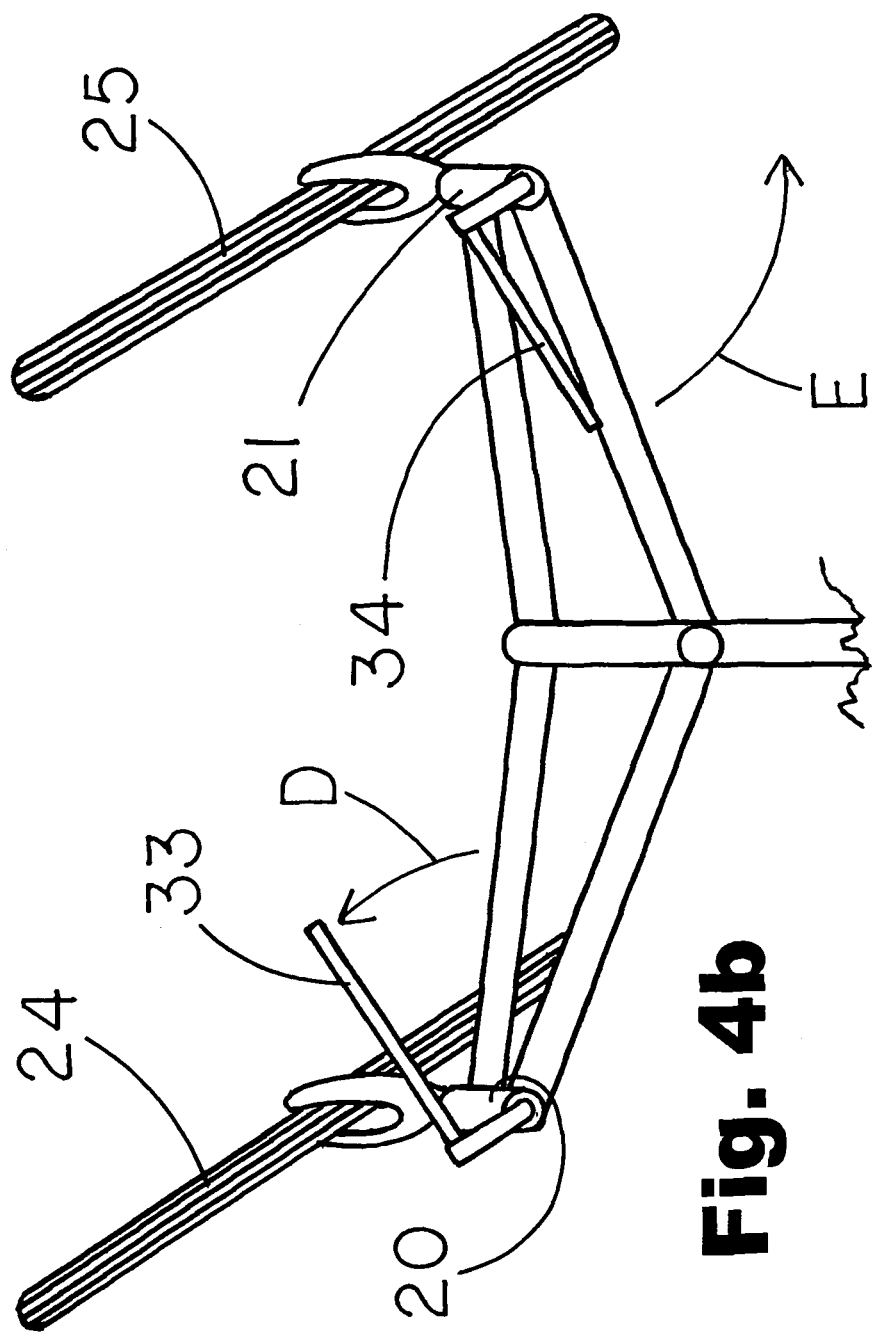

FIGS. 4a and 4b illustrate operation of the steering arrangement of the preferred embodiments. In FIG. 4a is shown a configuration where a vehicle built from the preferred embodiments is steered strait ahead. The frame 10 centerline is indicated by arrow "A". The left front wheel 24 centerline is indicated by arrow "B", and the right front wheel 25 centerline is indicated by arrow "C". Both the left front wheel 24 centerline and the right front wheel 25 centerline are substantially parallel to the frame 10 centerline.

A left turn configuration is shown in FIG. 4b. The left-side handlebar 33 rotates counter-clockwise in a direction indicated by arrow "D" while the right-side handlebar 34 rotates counter-clockwise in a direction indicated by arrow "E". The pivot point for the left-side handlebar 33 is the left-side head tube 20 while the pivot point for the right-side handlebar 34 is the right-side head tube 21. This turns both the left front wheel 24 and the right front wheel 25 to the left.

Executing a right turn involves a motion that is the opposite of the left turn motion. The left-side handlebar 33 would rotate clockwise in a direction that is the reverse of arrow "D" while the right-side handlebar 34 would rotate clockwise in a direction that is the reverse of arrow "E". Again, the pivot point for the left-side handlebar 33 is the left-side head tube 20 while the pivot point for the right-side handlebar 34 is the right-side head tube 21. The result would be that both the left front wheel 24 and the right front wheel 25 are turned to the right. The left-side handlebar 33 and the right-side handlebar 34 therefore have separate pivot points.

Figure 5:
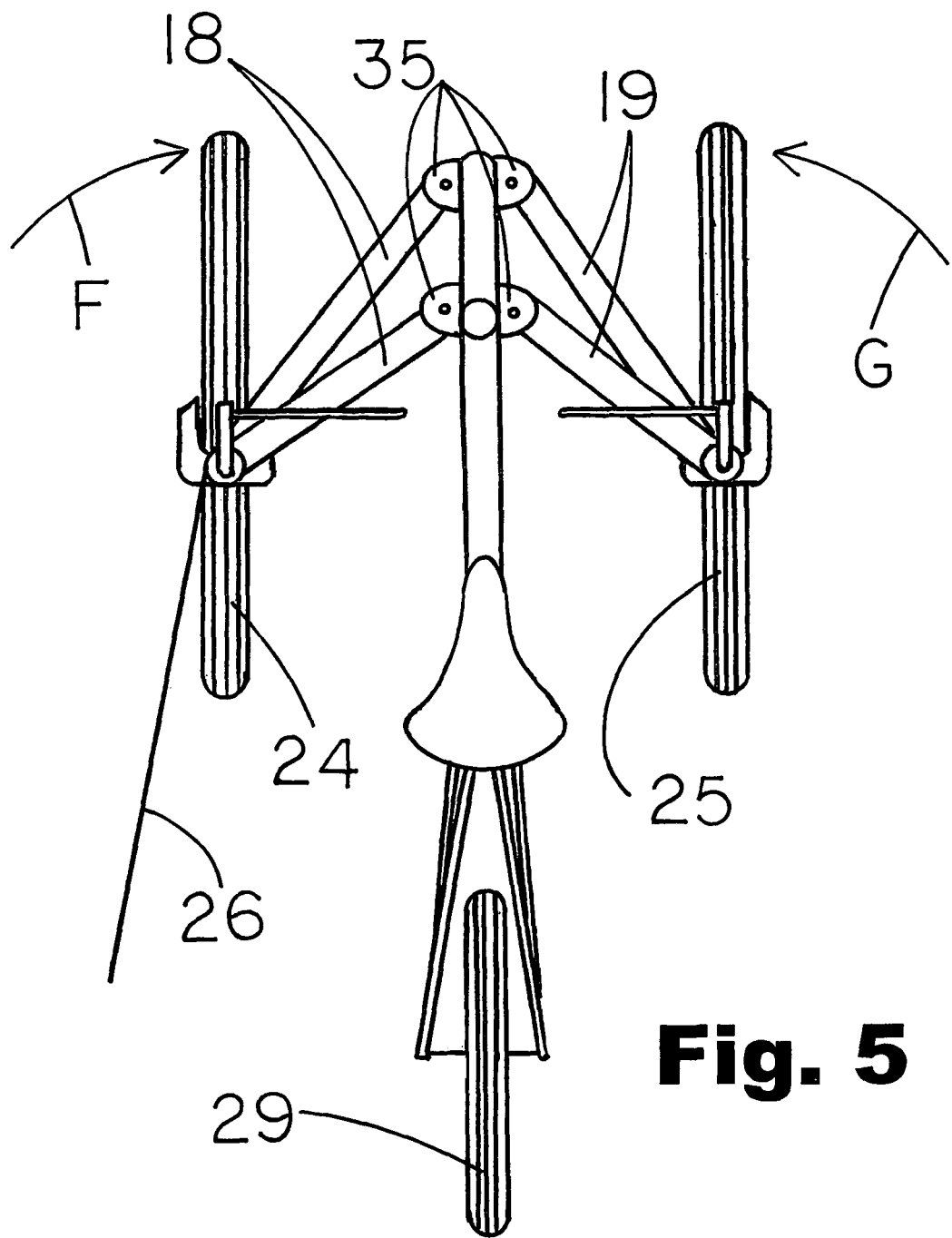
FIG. 5 is a top plan view of an embodiment that is foldable shown in the process of being folded.

In FIG. 5 is shown an embodiment that is foldable in a partially folded configuration. In this embodiment, the left-side lateral extension 18 and the right-side lateral extension 19 are both secured to the remainder of the frame 10 by hinge structures 35 that enable them to fold back towards the fixed rear drive wheel 29. (Though not shown, locking means would keep the left-side lateral extension 18 and the right-side lateral extension 19 locked in place when the vehicle is being ridden.) The tie rod 26 has been disconnected to permit the left-side lateral extension 18 and the right-side lateral extension 19 to swing backwards. At the same time, the left front wheel 24 rotates in the direction of arrow "F" and the right front wheel 25 rotates in the direction of arrow "G". This process would continue until the frame 10 achieves a maximum folded state, meaning it can be folded no further.

Although the description above contains numerous specificities, these should not be construed as limiting the scope of the present invention, but as merely providing illustrations of some of the presently preferred embodiments. It is to be therefore understood that many changes and modifications by one of ordinary skill in the art are considered to be within the scope of the invention. Thus the scope of the invention should be determined by the appended claims and their legal equivalents, rather than by examples given.

I claim:

1. An upright human-powered vehicle comprising:
a frame having a frame centerline;
a left front wheel rotatably coupled with the frame;
a right front wheel rotatably coupled with the frame, the left front wheel and the right front wheel on opposite sides of the frame centerline;
a rear drive wheel rotatably coupled with the frame and configured to drive the vehicle;
a left-side handlebar operably coupled with the left front wheel, the left-side handlebar configured to pivot about a left-side pivot axis to turn the left front wheel, the left-side handlebar having a proximal portion near the left-side pivot axis and a distal end extending inwardly towards the frame centerline; and
a right-side handlebar operably coupled with the right front wheel, the right-side handlebar configured to pivot about a right-side pivot axis to turn the right front wheel, the right-side handlebar having a proximal portion near the right-side pivot axis and a distal end extending inwardly towards the frame centerline, wherein the left-side pivot axis is different from the right-side pivot axis,
wherein the frame comprises a left-side head tube through which the left-side pivot axis passes, a right-side head tube through which the right-side pivot axis passes, a left-side lateral extension member extending from the centerline of the frame to the left-side head tube, and a right-side lateral extension member extending from the centerline to the right-side head tube.

2. The vehicle of claim 1, wherein the left-side lateral extension member and the right-side lateral extension member form a Y-shape.

3. The vehicle of claim 1, further comprising a left-side steering member coupled with the left-side head tube and a right-side steering member coupled with the right-side head tube, the left front wheel rotatably coupled with the left-side steering member and the right front wheel rotatably coupled with the right-side steering member.

4. The vehicle of claim 3, further comprising a left-side handlebar stem connecting the left-side handlebar to the left-side steering member and a right-side handlebar stem connecting the right-side handlebar to the right-side steering member.

5. The vehicle of claim 3, further comprising a tie member joining the left-side steering member with the right-side steering member.

6. The vehicle of claim 5, wherein the tie member is shorter than a distance between the left front wheel and the right front wheel.

7. The vehicle of claim 3, wherein each of the left-side steering member and the right-side steering member comprises one of a two-sided fork and a one-sided post.

8. The vehicle of claim 1, wherein the vehicle is configured to utilize Ackermann Steering Geometry.

9. The vehicle of claim 1, wherein the frame is foldable from a riding configuration to a stored configuration.

10. The vehicle of claim 1, further comprising two pedals operably coupled with the rear drive wheel.

11. The vehicle of claim 1, wherein the vehicle is configured such that turning the left-side handlebar causes the right-side handlebar to turn.

12. The vehicle of claim 1, wherein the distal end of the left-side handlebar is spaced from the frame centerline by a first distance, wherein the left-side pivot axis is spaced from the frame centerline by a second distance, the first distance less than the second distance.

13. An upright human-powered vehicle comprising:
a frame configured to support a rear drive wheel that is configured to drive the vehicle, the frame comprising:
a left-side head tube;
a right-side head tube;
a left-side lateral extension member extending from a centerline of the frame to the left-side head tube; and
a right-side lateral extension member extending from the centerline to the right-side head tube;
a left-side steering member configured to rotatably couple with a left front wheel, the left-side steering member disposed in the left-side head tube;
a right-side steering member configured to rotatably couple with a right front wheel, the right-side steering member disposed in the right-side head tube;
a tie member configured to join the left-side steering member with the right-side steering member, the tie member shorter than a distance between the left front wheel and the right front wheel;
a left-side handlebar operably coupled with the left-side steering member, the vehicle configured such that turning the left-side handlebar causes the left-side steering member and the left front wheel to turn; and
a right-side handlebar separate from the left-side handlebar, the right-side handlebar operably coupled with the right-side steering member, the vehicle configured such that turning the right-side handlebar causes the right-side steering member and the right front wheel to turn.

14. The vehicle of claim 13, further comprising a left-side handlebar stem connecting the left-side handlebar with the left-side steering member and a right-side handlebar stem connecting the right-side handlebar with the right-side steering member.

15. The vehicle of claim 13, wherein the frame is foldable from a riding configuration to a stored configuration.

16. The vehicle of claim 13, further comprising the left front wheel, the right front wheel, and the rear drive wheel.

17. The vehicle of claim 13, wherein at least one of the left-side steering member and the right-side steering member comprises a two-sided steering fork.

18. The vehicle of claim 13, wherein at least one of the left-side steering member and the right-side steering member comprises a one-sided steering post.

19. The vehicle of claim 13, wherein the frame has a frame centerline, the frame configured to support the left front wheel and the right front wheel on opposite sides of the frame centerline, wherein a distal end of the left-side handlebar is configured to extend inwardly towards the frame centerline, and wherein a distal end of the right-side handlebar is configured to extend inwardly towards the frame centerline.

20. An upright human-powered vehicle comprising:
a frame configured to rotatably support a left front wheel, a right front wheel, and a rear drive wheel, the rear drive wheel configured to drive the vehicle, the frame having a frame centerline, the frame configured to support the left front wheel and the right front wheel on opposite sides of the frame centerline, wherein the frame comprises a left-side head tube through which a left-side pivot axis passes, a right-side head tube through which a right-side pivot axis passes, a left-side lateral extension member extending from the centerline of the frame to the left-side head tube, and a right-side lateral extension member extending from the centerline to the right-side head tube;

a left-side handlebar configured to be operably coupled with the left front wheel; and a right-side handlebar configured to be operably coupled with the right front wheel, wherein the left-side handlebar and the right-side handlebar are not directly joined to one another, wherein a distal end of the left-side handlebar is configured to extend inwardly towards the frame centerline, and wherein a distal end of the right-side handlebar is configured to extend inwardly towards the frame centerline.

21. The vehicle of claim 20, wherein the vehicle is configured to utilize Ackermann Steering Geometry.

22. The vehicle of claim 20, wherein the frame is foldable from a riding configuration to a stored configuration.

* * * * *